US010326633B2

United States Patent
Reial et al.

(10) Patent No.: US 10,326,633 B2
(45) Date of Patent: Jun. 18, 2019

(54) ADAPTIVE SELECTION OF SIGNAL-DETECTION MODE

(71) Applicant: Telefonaktiebolaget LM Ericsson (publ), Stockholm (SE)

(72) Inventors: Andres Reial, Malmö (SE); Johan Axnäs, Solna (SE); Johan Rune, Lidingö (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 218 days.

(21) Appl. No.: 15/524,471

(22) PCT Filed: Jun. 29, 2016

(86) PCT No.: PCT/EP2016/065207
§ 371 (c)(1),
(2) Date: May 4, 2017

(87) PCT Pub. No.: WO2018/001478
PCT Pub. Date: Jan. 4, 2018

(65) Prior Publication Data
US 2018/0278455 A1    Sep. 27, 2018

(51) Int. Cl.
*H04L 27/26*        (2006.01)
(52) U.S. Cl.
CPC ...... *H04L 27/2663* (2013.01); *H04L 27/2657* (2013.01)
(58) Field of Classification Search
CPC .................................................. H04L 27/2663
See application file for complete search history.

(56) References Cited

U.S. PATENT DOCUMENTS

| 6,728,326 B1 * | 4/2004 | Fulghum | H04L 7/04 370/514 |
| 2003/0043947 A1 * | 3/2003 | Zehavi | H04B 1/7156 375/365 |

(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, 1-129.

(Continued)

*Primary Examiner* — Andrew Lai
*Assistant Examiner* — Andrew C Lee
(74) *Attorney, Agent, or Firm* — Murphy, Bilak & Homiller, PLLC

(57) ABSTRACT

A wireless device detects a synchronization signal by obtaining (210), from a received signal, a sequence of samples, and calculating (220) a differentially decoded sequence from the obtained sequence of samples. The wireless device correlates (230) the calculated differentially decoded sequence with a first reference sequence corresponding to the synchronization signal, at each of a plurality of time offsets, and identifies which of the plurality of time offsets results in a largest correlation result. In response to determining (240) that the largest correlation result does not meet a predetermined reliability criterion, the wireless device correlates (250) the obtained sequence of samples with a second reference sequence, at each of a plurality of time and frequency offsets, and identifies which combination of time offset and frequency offset results in a largest correlation result. The first reference sequence comprises a differentially decoded version of the second reference sequence.

25 Claims, 3 Drawing Sheets

(56) References Cited

U.S. PATENT DOCUMENTS

| | | | |
|---|---|---|---|
| 2005/0219068 A1* | 10/2005 | Jones | G01S 5/30 341/50 |
| 2006/0061691 A1* | 3/2006 | Rabinowitz | G01S 5/0221 348/625 |
| 2006/0064725 A1* | 3/2006 | Rabinowitz | G01S 5/0036 725/68 |
| 2007/0121765 A1 | 5/2007 | Min et al. | |
| 2008/0101306 A1 | 5/2008 | Bertrand et al. | |
| 2008/0170644 A1* | 7/2008 | Kleider | H04B 1/7073 375/343 |
| 2008/0170645 A1* | 7/2008 | Kleider | H04L 25/4902 375/343 |
| 2009/0003308 A1* | 1/2009 | Baxley | H04B 1/59 370/350 |
| 2010/0182979 A1* | 7/2010 | Malladi | H04J 11/0069 370/336 |
| 2011/0095866 A1* | 4/2011 | Karr | G06Q 10/00 340/10.1 |
| 2013/0259013 A1* | 10/2013 | Malladi | H04W 56/00 370/336 |
| 2015/0215968 A1 | 7/2015 | Jiang et al. | |
| 2016/0242103 A1* | 8/2016 | Mindru | H04J 11/0079 |
| 2018/0014268 A1* | 1/2018 | Kuppusamy | H04L 27/266 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.5.0, Dec. 2008, 1-82.

Kim, Jung-In et al., "SSS Detection Method for Initial Cell Search in 3GPP LTE FDD/TDD Dual Mode Receiver", 9th International Symposium on Communications and Information Technology (ISCIT), Sep. 28-30, 2009, 1-5.

Tsai, Pei-Yun, "A New Cell Search Scheme in 3GPP Long Term Evolution Downlink OFDMA Systems", International Conference on Wireless Communications & Signal Processing (WCSP 2009), Nov. 13-15, 2009, 1-5.

Unknown, Author, "Zadoff—Chu sequence", From Wikipedia, the free encyclopedia, https://en.wikipedia.org/wiki/Zadoff-Chu_sequence, Mar. 3, 2016, 1-3.

Yang, Xiumei et al., "PSS Based Time Synchronization for 3GPP LTE Downlink Receivers", IEEE 13th International Conference on Communication Technology (ICCT 2011), Sep. 25-28, 2011, 1-4.

* cited by examiner

ADAPTIVE SELECTION OF SIGNAL-DETECTION MODE

TECHNICAL FIELD

The present disclosure is generally related to wireless communications, and is more particularly related to techniques and devices for detecting time and frequency offsets for a synchronization sequence in a received signal.

BACKGROUND

To establish a communication link between two wireless devices, a wireless device receiving a signal transmitted by the other wireless device must synchronize receiver processing with the received signal. Both time synchronization and frequency synchronization are required, to achieve optimal demodulation and decoding of information carried by the received signal. This time synchronization and frequency synchronization may then be applied to signals transmitted by the wireless device. For example, time synchronization and frequency synchronization are necessary for a wireless device (often referred to as a user equipment, or "UE," in industry terminology) to access a wireless network, whether as part of a random access (RA) process for initial access, or for a transition by the wireless device from an idle state to an active state.

To aid the synchronization process, standardized air interfaces typically provide for the transmission of synchronization, or "synch," signals. One example is the synchronization signals transmitted in the downlink (base-station-to-user-equipment transmissions) in the Long-Term Evolution (LTE) networks standardized by members of the $3^{rd}$-Generation Partnership Project (3GPP). These downlink synchronization signals in LTE comprise two components: a primary synchronization signal (PSS), used for coarse frequency synchronization and symbol time estimation signal, and a secondary synchronization signal (SSS), used for frame timing estimation. For convenience, cell-identity information is also encoded into the PSS and SSS signal, in LTE systems.

In LTE, the synchronization signals are transmitted twice in each 10-millisecond radio frame. In Frequency-Division Duplexing (FDD) mode, the PSS is transmitted in the last Orthogonal-Frequency Division Multiplexing (OFDM) symbol of the first and eleventh slot of each radio frame. This permits the UE to acquire slot-boundary timing, without having to worry yet about the cyclic prefix length. (Time-Division Duplexing, or TDD, mode uses a different frame structure that is not detailed here but that is described, along with the FDD-mode structure, in 3GPP TS 36.211 v8.5.0, "Physical Channel and Modulation," December 2008.) The PSS uses a sequence known as Zadoff-Chu.

More specifically, in the frequency domain, the PSS occupies the central six resource blocks (RBs) of the LTE downlink signal, no matter what the allocated bandwidth of the signal is. This allows the UE to synchronize to the network without knowing the allocated signal bandwidth. (The SSS also occupies these same six resource blocks). The synchronization sequence, i.e., the Zadoff-Chu sequence in the case of the PSS, is 62 symbols long, and is mapped to 62 OFDM subcarriers, with 31 subcarriers mapped on each side of the DC sub-carrier, which is not used. Because each RB includes 12 subcarriers, this leaves five subcarriers at the ends of this six-RB group unused.

The SSS in the FDD-mode LTE downlink signal is transmitted in the next-to-last symbol of the first and $11^{th}$ slot of each radio frame, and is thus immediately before the PSS. This makes it easy for the UE to determine the cyclic prefix length that is in use, by comparing the timing of the PSS and the SSS. (In LTE, there are two cyclic prefix lengths that are possible, and hence two different OFDM symbol lengths.) Each instance of the SSS signal, which is based on so-called M-sequences, is also a 62-symbol sequence mapped to same subcarriers as the PSS. However, the SSS signal alternates in a predetermined manner from one transmission to the next. This allows the UE to determine the position of the 10-millisecond frame boundary.

A key part of the synchronization process is timing offset estimation, which is typically performed by comparing the received signal to multiple reference signal hypotheses that correspond to different offsets in time. In LTE UEs, the bulk of the searching effort is associated with time-domain correlation of the PSS for different time-offset hypotheses. Out of the correlation results for many hypotheses, the largest correlation peak is used for determining the time-offset estimate.

As suggested above, a synchronization signal is typically based on a pre-defined sequence of symbols, referred to as a synchronization sequence. These synchronization sequences are carefully chosen to ease the synchronization process. A common type of synchronization sequence, which is used in the LTE PSS, is the Zadoff-Chu design. Due to the favorable cross- and auto-correlation properties of sequences that fall in this family of sequences, each synchronization sequence from the Zadoff-Chu family provides good robustness with respect to other sequences from the same family, as well as with respect to time-shifted copies of itself. Thus, correlation peaks corresponding to incorrect time alignment hypotheses are few and relatively low, so false alarm probabilities can be kept low.

To coherently detect the classical synchronization sequences, including Zadoff-Chu synchronization sequences, the receiver must maintain substantial phase coherence over the entire length of the sequence, e.g., the OFDM symbol during which the PSS is transmitted. Therefore, in the presence of any non-negligible frequency uncertainty, the correlation reference sequences also need to incorporate multiple frequency-offset hypotheses, in addition to the time-offset hypotheses discussed above. For each frequency-offset hypothesis, the reference sequence is distorted in accordance to the particular frequency offset. Multiple time-shifted versions of this distorted reference sequence are compared to the received signal; the best correlation result from these multiple trials indicates the most likely time offset and frequency offset.

It should be appreciated that searching across multiple frequency hypotheses in addition to across multiple time offsets has a multiplicative effect on the number of hypotheses that must be tested, and thus increases the computational burden of the synchronization process. Techniques that reduce this computational burden are thus desired.

SUMMARY

Detailed below are techniques for detecting time and frequency offsets for a synchronization signal in a received signal. One example method begins with obtaining, from the received signal, a sequence of samples for a given time interval. The method continues with the calculation of a differentially decoded sequence from the obtained sequence of samples, each element of the differentially decoded sequence representing a phase shift between a pair of samples from the obtained sequence of samples. The calculated differentially decoded sequence is then correlated with a first reference sequence corresponding to the synchronization signal, at each of a plurality of time offsets, to generate a corresponding plurality of first correlation results; the time offset resulting in a largest one of the first correlation results is then identified. The method continues with determining that the largest one of the first correlation results does not meet a predetermined reliability criterion. This may comprise, for example, comparing a magnitude of the largest one of the first correlation results or a scaled magnitude of the largest one of the first correlation results to a threshold value and determining that the magnitude of the largest one of the first correlation results or the scaled magnitude of the largest one of the first correlation results is less than (or less than or equal to) the threshold value. The magnitude of the largest one of the first correlation results may be scaled by the inverse of the average magnitude of all of the first correlation results other than the largest one of the first correlation results, for example. Equivalently, the magnitude of the largest one of the first correlation results may be evaluated by determining whether the magnitude of the largest one of the first correlation results is larger, by a predetermined multiplicative factor, than the average of all of the first correlation results other than the largest one of the first correlation results. Other possible reliability criteria for evaluating the largest one of the first correlation results are detailed herein.

The method continues, in response to determining that the largest one of the first correlation results does not meet the predetermined reliability criterion, with correlating the obtained sequence of samples with a second reference sequence, at each of a plurality of time offsets and at each of a plurality of frequency offsets, to generate a corresponding plurality of second correlation results, and identifying which combination of time offset and frequency offset results in a largest one of the second correlation results.

Other embodiments disclosed herein include corresponding wireless device. An example wireless device detects a synchronization signal by obtaining, from a received signal, a sequence of samples, and calculating a differentially decoded sequence from the obtained sequence of samples. The wireless device correlates the calculated differentially decoded sequence with a first reference sequence corresponding to the synchronization signal, at each of a plurality of time offsets, and identifies which of the plurality of time offsets results in a largest correlation result. In response to determining that the largest one of the first correlation results does not meet the predetermined reliability criterion, the wireless device correlates the obtained sequence of samples with a second reference sequence, at each of a plurality of time and frequency offsets, and identifies which combination of time offset and frequency offset results in a largest correlation result. The first reference sequence comprises a differentially decoded version of the second reference sequence.

Still other embodiments disclosed herein include computer program products corresponding to the above-summarized techniques, and computer-readable media, including memory circuits, storing such computer program products. Of course, the present invention is not limited to the above features and advantages. Those skilled in the art will recognize additional features and advantages upon reading the following detailed description, and upon viewing the accompanying drawings.

DETAILED DESCRIPTION

Figure 1:
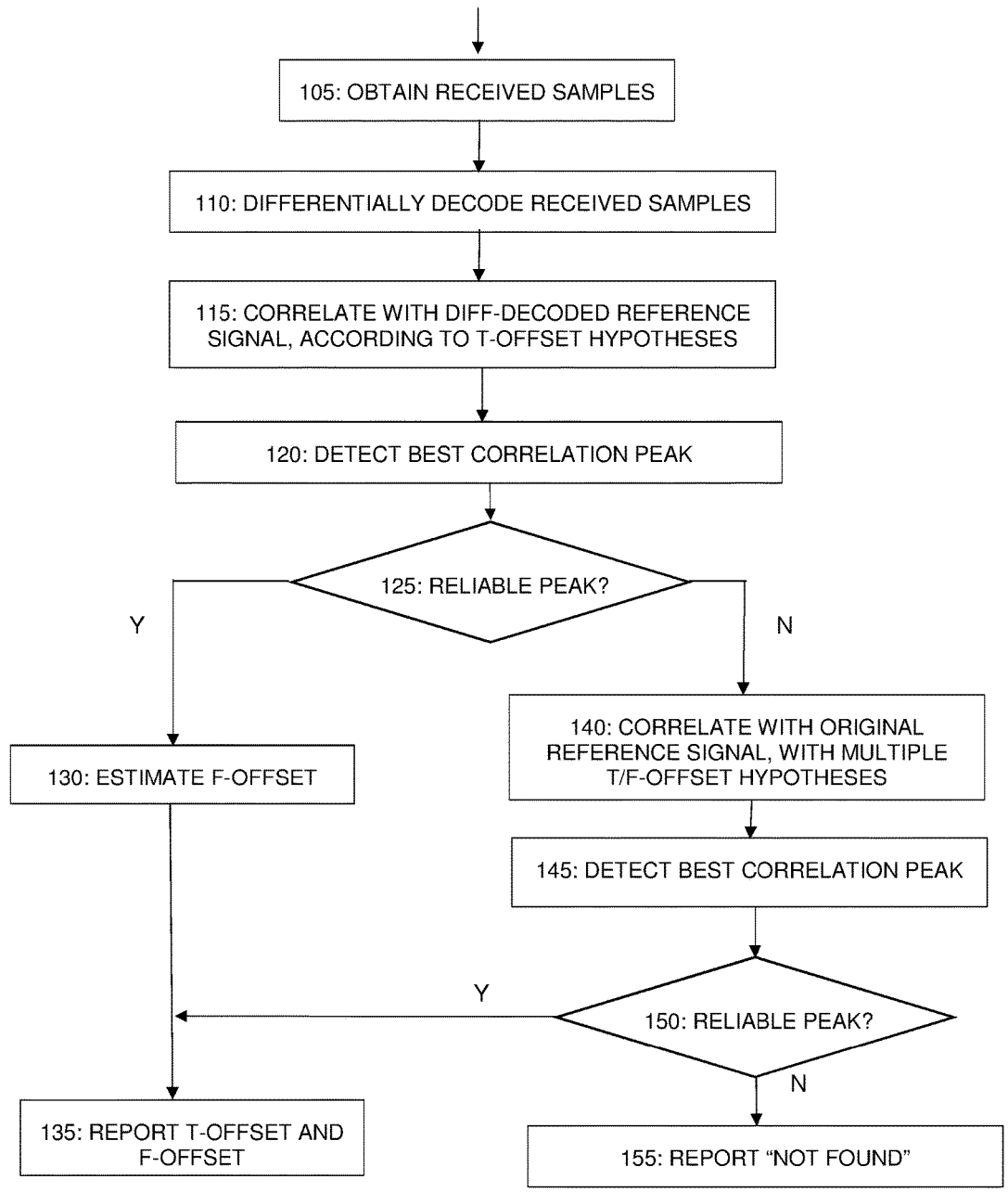
FIG. 1 illustrates an example method according to some embodiments of the presently disclosed techniques.

The presence of a synchronization signal in a received signal is often detected using so-called coherent detection. With coherent detection, the phases of all samples/symbols are jointly considered, in that all samples/symbols over a given time period are effectively being constructively/coherently added in the received signal processing. Coherent detection may be performed, for example, by correlating a time series of complex-valued samples taken from the received signal with a reference sequence corresponding to the synchronization signal as represented in the time domain.

Traditional coherent detection does not tolerate frequency errors well, since the frequency error causes the samples in the time-domain sequence to diverge, over time, from a reference sequence that is time- and phase-aligned with the time-domain sequence at the beginning, for example. Accordingly, the frequency-offset search dimension typically must be added to the synchronization process when using coherent detection techniques. The search space size thus increases as the product of the number of time-offset and frequency-offset hypotheses, proportionally increasing the computational load per synchronization task.

When no frequency errors are present, Zadoff-Chu sequences have very attractive autocorrelation properties. Unfortunately, these sequences exhibit an undesirable property in that, for certain combinations of time and frequency offsets, the correlation results provide relatively large peaks, thus potentially triggering false alarms. A coherent receiver detecting a Zadoff-Chu sequence may thus signal the presence of a received signal at incorrect time and frequency offsets. In an LTE UE receiver, where the PSS is based on the Zadoff-Chu design, a false alarm when detecting the PSS will result in no SSS or other signals being found at these offsets. As a result, when the UE receiver determines that the SSS cannot be found, it needs to return to search for PSS. This increases the computational complexity associated with the search and complicates the synchronization process, since additional logic is needed to prevent previously detected false peaks from interfering with subsequent detections.

Differential encoding of a synchronization signal may be used with synch sequences, where the symbols that make up the synchronization sequence, which may be referred to as the "signature," are embedded in phase shifts between adjacent samples. Then, a differentially decoding receiver may be used, where sufficient phase stability is required only between adjacent received samples, rather than over the entire sequence or large parts of it. This allows time synchronization to be achieved in the presence of larger intersample frequency errors, without resorting to searching multiple hypotheses in the frequency dimension.

Differential decoding has been shown to obviate the need for frequency-dimension searching. Differentially decoding received signals also eliminates effects of a possible frequency offset, thus removing the basis for the false correlation peak phenomenon. Unfortunately, differential decoding incurs a decision accuracy penalty, with respect to signal-to-noise ratio (SNR), compared to coherent detection, where the phases of all samples or symbols are jointly considered, i.e., effectively added together, in a constructive manner, in the signal processing. The penalty is 3 dB at medium-to-high SNRs and increasingly large at lower SNRs. This means that differentially encoded signal transmission is not attractive from a coverage viewpoint.

Embodiments of the present invention address these problems by performing synchronization with a received synchronization signal, such as the Zadoff-Chu-based PSS in LTE, in two stages, where the second stage is selectively applied. In a first stage of the synchronization process, as discussed in further detail below, differential decoding is applied to the received sample sequence, with the resulting sequence correlated against a set of time-domain reference sequences that represent time-shifted and differentially decoded PSS sequences. The largest correlation peak from this stage is evaluated against a predetermined reliability criterion, to determine whether the result of this first stage is reliable, i.e., whether or not the magnitude of the largest correlation peak is sufficiently large so as to indicate, to at least a particular probability, that the synchronization signal is present in the received signal, at or near the determined time offset. It will be understood, of course, that the particular criterion and the associated degree of reliability required may vary from one implementation to another; the key here is that there is a test to separate those results that are deemed reliable from those that are deemed unreliable.

If a reliable correlation peak is detected in this first stage, which will typically happen with medium-to-high SNRs, e.g., above about 0 dB, the time-offset corresponding to the "winning" reference signal, i.e., the time-shifted, differentially decoded PSS that yields the highest correlation peak, is selected. The frequency error of the received signal can then be determined by de-rotating the differentially decoded sequence using the winning reference sequence.

If, on the other hand, no reliable correlation peak is detected, which will usually occur at low SNRs (e.g., below about 0 dB in an LTE receiver), the second stage is triggered. In this stage of the procedure, the receiver performs the classical, coherent-detection procedure by searching across time and frequency, correlating samples of the received signal against appropriate time-shifted and frequency-shifted reference sequences.

Advantages of this two-stage procedure, which is described in further detail below, is that this procedure combines the strengths of coherent and differentially decoded reception modes, to reduce UE complexity and improve performance in most scenarios. This is done without sacrificing detection performance in coverage-limited situations. In non-coverage-limited cases, the synch search complexity is significantly reduced, because the frequency dimension is omitted. If the synch sequence is a Zadoff-Chu sequence, the probability of false alarms is also reduced (and driven towards zero at high SNRs), because the false peak phenomenon is not present in the differential-decoding stage. In coverage-limited cases, the receiver reverts to the classical coherent structure, with maximal detection performance at low SNRs. While the two-stage process adds some overhead to the conventional process in low-SNR scenarios, where both stages are used, the additional overhead from the differential-decoding stage is small, approximately equivalent to the testing of one additional frequency hypothesis in the conventional detection process.

In short, the effect of the two-stage techniques described herein is to ensure that synchronization is performed using the better performing of the two detection modes, i.e., the differential-decoding mode and the coherent detection mode, regardless of the SNR operating point. The differential-decoding mode, which will be applicable in most scenarios, is also computationally superior to the legacy approach of always performing coherent detection. Because the average search time is almost directly proportional to the UE's inactive/dormant-mode energy consumption, the average search time is inversely proportional to the device's battery life. Thus, ensuring that synchronization is performed using the quicker differential-detection mode when appropriate will improve battery life of the UE.

FIG. 1 is a process flow diagram illustrating an example method implemented by a wireless device, according to the two-stage synchronization procedure described in general terms above. The process begins, as shown at block 105, with the obtaining of received samples in the wireless device. This is done using conventional techniques, e.g., using a receiver that includes a low-noise amplifier and a downconversion circuit, with appropriate analog filtering, followed by a digital sampling circuit (i.e., an analog-to-digital converter).

If the transmitted samples of the synchronization signal (e.g., based on a length-K Zadoff-Chu sequence) are denoted as $a(n)$, then the samples $r(n)$ of the received signal are given by:

$$r(n)=ha(n-n_0)e^{j2\pi n T_s f_0}+w(n),$$

where h is the effect of the propagation channel, $n_0$ is the unknown time delay due to timing misalignment, $T_s$ is the sample interval, $f_0$ is the unknown frequency offset, and $w(n)$ is receiver noise.

As shown in block 110, a differentially-decoded received sequence $d(n)$ is then created from the received samples $r(n)$, according to:

$$d(n)=r(n+1)r^*(n),$$

where $r^*(n)$ represents the complex conjugate of $r(n)$.

As shown at block 115, the differentially-decoded received sequence $d(n)$ is correlated with each of several time-shifted, differentially-decoded reference signals, which may be referred to as time-offset (or "T-offset") hypotheses. These are time-shifted versions of a differentially-decoded reference sequence $b(n)$, which is prepared according to:

$$b(n)=a(n+1)a^*(n).$$

A first set of correlation results $c(t)$ for each of the different hypothesized time offsets t are computed, as:

$$c(t)=\Sigma_{n=0}^{N-1}b(n)d^*(n+t)$$

where N is a number of samples that spans the synchronization signal.

As shown at block 120, the "best" correlation peak is detected. In other words, the time hypothesis $t_0$ is determined such that $|c(t_0)|$, the magnitude of the correlation result for the time-offset hypothesis $t_0$, yields the largest correlation peak, i.e., $|c(t_0)| \geq |c(t')|$ for all t'. If no errors occur, which will typically be the case when the SNR is sufficiently high, then $t_0=n_0$. In other words, the detected time hypothesis $t_0$ will match the actual time offset $n_0$, at least to an expected precision, given the synchronization signal characteristics.

If the signal conditions are not favorable, however, the time offset detected with the steps shown at blocks 110-120 may not be reliable. Accordingly, as shown at block 125, the process further includes using a predetermined reliability criterion to determine whether or not the peak at $t_0$ is sufficiently large that it can be considered a reliable result, i.e., whether or not the magnitude of the largest one of the first set of correlation results is sufficiently large so as to indicate, to at least a particular probability, that the synchronization signal is actually present in the received signal, at the predetermined time offset, and thus that the largest correlation result is not likely to represent a "false" detection. This may be done, for example, by comparing the ratio of $|c(t_0)|$ to a comparison value $v$ with a threshold $\tau$. Thus, in some embodiments, if $$\frac{|c(t_0)|}{v} > \tau,$$

then the result of the peak detection based on differential decoding is deemed reliable. It will be appreciated that this particular approach comprises scaling the magnitude of the largest one of the first set of correlation results, and then comparing the scaled magnitude to the threshold value $\tau$. It will be further understood that this is equivalent to evaluating the magnitude of the largest one of the first correlation results by determining whether or not the magnitude of the largest one of the first correlation results is larger, by a predetermined multiplicative factor, than the comparison value $v$, i.e.:

$$|c(t_0)| > \tau v$$

It will be further understood that the "greater than" test seen in the examples above may be replaced with a "greater than or equal to" test, with effectively the same results. Likewise, it will be appreciated that the criterion may be adjusted or reformulated in many different ways, including so as to include a "less than" or "less than or equal to" test.

The comparison value $v$ in the above example may be, for example, a second-best $|c(t)|$ value, or the average of all obtained $|c(t)|$, or an estimate of the variance of noise and interference. Numerous alternatives are possible: the $|c(t_0)|$ values may be included or excluded from the average, $|c(t)|^2$ may be used instead, etc. One practical way to implement the reliability criterion in a receiver is to compare the acquired correlation peak $|c(t_0)|$ to the average correlation result for hypotheses that are known (or at least thought) to be incorrect, i.e., all hypotheses other than the one corresponding to the correlation result with the highest magnitude. The average correlation result for these other hypotheses may be considered a "floor" against which the correlation peak is evaluated. This approach is easy to approximate in the receiver—the correlation result from numerous candidate sequences are collected, the best one is picked, and the floor is estimated as the average of the rest. It will be appreciated that this is not a strictly optimal approach, due to an associated bias phenomenon, but the approach is good enough for determining the reliability of the peak.

If the result of the peak detection process based on differential decoding is determined to be reliable, i.e., to meet the predetermined reliability criterion as discussed above, then the frequency offset for the received synchronization signal is detected, by comparing the differentially decoded samples to the corresponding differentially decoded reference sequence. This is shown at block 130. The per-sample phase error $p_0$ is estimated as:

$$p_0 = \arg\frac{1}{N}\sum_{n=0}^{N-1} d(n+t_0)a^*(n),$$

which is trivially proportional to the frequency offset $f_0$. Once again, if no errors occur, the detected frequency offset matches the true offset of the received synchronization signal, at least within an expected precision. The resulting time and frequency offsets $t_0$ and $f_0$ may thus be reported to other receiver algorithms, as shown at block 135 in FIG. 1.

If the evaluation of the first-stage peak detection process, as shown at block 125, indicates that the largest one of the correlation results from the first stage does not meet the predetermined reliability criterion, i.e. the result is unreliable, on the other hand, then a traditional coherent detection process is performed over a time-frequency search space, as shown at block 140. This is done by correlating the received sample sequence $r(n)$ with each of several reference hypotheses $a_{t,f}(n)$, where these reference hypotheses are obtained by modifying the original reference sequence $a(n)$ to capture the timing-offset and frequency-offset hypotheses. (Note that it is the original received sample sequence $r(n)$ that is used in these correlations, rather than the differentially-decoded version $d(n)$.) This will result in a second set of correlation results spanning the searched timing and frequency offset space, with each of the correlation results in this second set corresponding to a particular combination of time-offset and frequency-offset hypotheses. Note that this second set of correlation results will generally be considerably larger than the first set, which was obtained in the differential-decoding-based stage.

A best correlation peak from the second set of correlation results is then detected, as shown at block 145. Again, this is the peak having the highest amplitude. As shown at block 150, this peak is also evaluated against a predetermined reliability criterion, to determine whether it is reliable. This predetermined reliability criterion may have the same general form as the reliability criterion used in the first stage, in some embodiments. As was the case with the largest correlation result from the differential-decoding stage of the process, the evaluation of the largest one of the second correlation results against the predetermined reliability criterion may comprise, for example, comparing the ratio of the largest correlation result's amplitude to a comparison value with a threshold value.

If the outcome of this evaluation indicates that the peak obtained by the coherent detection stage is reliable, then the resulting estimates of the time and frequency offsets s $t_0$ and $f_0$ can be reported to other parts of the receiver and transmitter processing, as shown at block 135. Otherwise, synchronization failure is reported to a controlling process, unit, or device, in or associated with the receiver, as shown at block 155.

It will be appreciated that the process described above and illustrated in FIG. 1 is for a single instance of the synchronization process. In practice, the detection process may be periodically repeated, for example. It should also be appreciated that the process described above and illustrated above is for a single synchronization signal, or a single synchronization signal component. The same or a similar process may be used, whether in parallel or in series, to detect another synchronization signal or synchronization signal component. For example, the process described above, or variants thereof, may be applied to the PSS in the LTE downlink, and then applied to the SSS. It should be understood that the search space dimensions and/or resolution may vary from one instance to the next, in some embodiments.

In many receivers, as suggested above, the synchronization process is periodically repeated. In some receivers implementing the techniques described above, a selected detection mode may be kept over a time interval that is longer than individual measurements, i.e., that extends over multiple synchronization procedures.

For example, if during one instance of the process shown in FIG. 1 it is found that no reliable peak in the detection stage based on differential decoding has been found, i.e., corresponding to the "N" arrow exiting block 125 of the figure, the receiver may enter and remain in the coherent detection mode, i.e., the mode corresponding to blocks 140, 145, and 150, for a predetermined period of time, or for a period of time that depends on a measure of how far the largest one of the correlation results is from meeting the predetermined reliability criterion. For the purposes of the present discussion, the "coherent detection mode" may be understood as a mode in which multiple time-offset and multiple frequency-offset hypotheses must be evaluated to identify a best correlation result, rather than just time-offset hypotheses. This period of time over which the coherent detection mode is used may extend over several synchronization attempts—during this period of time, the detection steps based on differential decoding, i.e., the steps shown at blocks 110-120, are not attempted. After the period of time has passed, the receiver may return into the mode (blocks 110-120) where the reliability of differential decoding-based detection is tested. This approach further reduces the overhead associated with the initial differentially decoded detection step in cases where differential decoding provides insufficient detection performance.

Similarly, in some embodiments, a measure of how far the largest one of the first correlation results exceeds the predetermined reliability criterion may be used to determine that the reliability testing shown at block 125 may be omitted, for some period of time. Thus, for example, if the reliability of the differential decoding-based detection result is found to be high, e.g., such that the largest one of the first correlation results exceeds the predetermined reliability criterion by a particular ratio, the reliability testing shown at block 125 may be omitted for a predetermined period, or for a period depending on the degree of reliability of the detection.

Additionally, a receiver implementing any of the techniques described above may also use an estimated signal quality for the received signal, e.g., an estimated signal-to-noise-plus-interference ratio (SINR), to guide the mode selection. While operating in long-term coherent detection mode, for example, as described above, it may return to the detection mode based on differential decoding (e.g., as shown at blocks 110-120 of FIG. 1) only when the estimated signal quality rises over a predetermined signal quality threshold, e.g., 0 dB.

In some embodiments, in scenarios where the receiver receives other relevant transmissions in between receptions of sync signals, the reception of these transmissions, and signal quality measures associated with these receptions, may be used to determine the suitable detection mode for the next time a sync signal is to be received, i.e., to answer the question of whether the receiver should try differential-decoding-based detection first, or go directly to coherent detection. Another approach could be that if the SNR and the timing advance remain stable during a period between two sync signal receptions, then the same detection mode as the last time is used.

If a SNR condition (or some other condition) is used to control the detection mode selection, this condition could be made stricter or more relaxed, depending on properties of the receiver. For example, a UE with low computational capability could favor differential-decoding-based detection more than other UEs. The UE's energy supply, e.g., battery status, could also impact the condition. For instance, a Machine-Type Communication (MTC) device expected to operate for years on the same battery, an MTC device operating on energy harvesting, or any UE with a low battery level could move the condition threshold to more favor the most energy efficient detection mode, i.e., the differential-decoding-based approach described herein.

Furthermore, special considerations could be given to relays and self-backhauling. In these cases, a stable, relatively high SNR may often be assumed; at least the device is typically not operating at coverage limits. Then, fixed differential-decoding-based detection could be invoked in a receiver operating in this mode.

It should also be understood that the techniques described above may be applied using multiple reference sequence candidates where, for example, the differentially decoded received signal samples are correlated against time-shifted versions of each of several different differentially decoded versions of reference signal sequences. For example, the PSS transmitted in any given cell in an LTE system may be based on one of three different Zadoff-Chu sequences. Thus, an LTE UE applying the techniques described above may calculate a differentially decoded sequence from a sequence of samples obtained from the received signal, just as described above, but then correlate this differentially decoded sequence with each of three different reference sequences, at each of several time offsets, to determine not only which time offset results in the largest correlation result, but which reference sequence results in the largest correlation result. The three reference signals in this case would be differentially decoded versions of time-domain reference signal sequences corresponding to the three Zadoff-Chu sequences on which the PSS can be based. In these embodiments, then, a sequence identity (e.g., $N_{ID}^{(2)}$, as specified in the LTE standards) is reported to other parts of the UE processing stack, along with the determined time offset.

The techniques described herein apply to scenarios, such as in LTE, where a regular (not differentially-encoded) sequence is transmitted and differential decoding is nevertheless applied by the receiver, to generate differentially decoded samples to be correlated with a differentially decoded version of a reference signal sequence. These techniques, however, are equally applicable to scenarios where the originally transmitted synchronization signal is differentially encoded.

Furthermore, while the techniques described herein are particularly applicable to a UE detecting downlink synchronization signals, such as the LTE PSS, these techniques may also be applied by an access node, to synchronize with synchronization signals transmitted in the uplink, or by a wireless device participating in peer-to-peer communications.

In view of the detailed techniques and variants described above, it will be appreciated that FIG. 2 is a process flow diagram illustrating a method, as implemented in a wireless device, for detecting time and frequency offsets for a synchronization signal in a received signal, according to some embodiments of the presently disclosed techniques. For the purposes of this FIG. 2, it is assumed that the outcome of the first stage, shown at blocks 210-230 and in which the correlations use differentially decoded sequences, is an unreliable result; hence a coherent detection mode, shown at block 250, is then triggered. Of course, in any practical implementation, the differentially-decoding-based detection stage will often be successful, such that the coherent detection stage is unnecessary. However, in most practical implementations of the techniques described herein, the coherent detection mode will at least sometimes be necessary, in which case the flow of operations will look something like that shown in FIG. 2.

As shown at block 210, the illustrated method begins with obtaining, from the received signal, a sequence of samples for a given time interval. This is done using conventional techniques, e.g., using a receiver that includes a low-noise amplifier and a downconversion circuit, with appropriate analog filtering, followed by a digital sampling circuit (i.e., an analog-to-digital converter). The time interval may be selected so that at least one instance of the targeted synchronization signal is expected to fall in the interval. The time interval may be the length of an LTE radio frame, i.e., 10 milliseconds, for example, or some portion of the LTE radio frame length.

As shown at block 220, the method continues with the calculation of a differentially decoded sequence from the obtained sequence of samples, each element of the differentially decoded sequence representing a phase shift between a pair of samples from the obtained sequence of samples. As shown at block 230, the calculated differentially decoded sequence is then correlated with a first reference sequence corresponding to the synchronization signal, at each of a plurality of time offsets, to generate a corresponding plurality of first correlation results; the time offset resulting in a largest one of the first correlation results is then identified. As discussed above, this step may be performed for each of several candidate reference sequences, in which case the reference sequence that produces the largest correlation result is also identified.

As shown at block 240, the method continues with determining that the largest one of the first correlation results does not meet a predetermined reliability criterion. Several possible criteria were described in detail above, in the description of FIG. 1. In some embodiments, for example, determining that the largest one of the first correlation results does not meet the predetermined reliability criterion comprises comparing a magnitude of the largest one of the first correlation results or a scaled magnitude of the largest one of the first correlation results to a threshold value. In some of these embodiments, the predetermined reliability criterion comprises one of the following, for example: the magnitude or scaled magnitude of the largest one of the first correlation results exceeding the threshold value; the magnitude or scaled magnitude of the largest one of the first correlation results equaling or exceeding the threshold value; the scaled magnitude of the largest one of the first correlation results being less than the threshold value; and the scaled magnitude of the largest one of the first correlation results being less than or equal to the threshold value.

In some embodiments, determining that the largest one of the first correlation results does not meet the predetermined reliability criterion comprises calculating a ratio of the magnitude of the largest one of the first correlation results to a comparison value, and determining that the ratio is less than a threshold value, where a ratio greater than the threshold value indicates a reliable correlation result. In various embodiments, the comparison value may be one or more of: the magnitude of the second-largest one of the first correlation results; the average magnitude of all of the first correlation results; the average magnitude of all of the first correlation results other than the largest one of the first correlation results; and an estimate of noise and interference variance. Other comparison values and other evaluation criteria are possible.

In the operation shown at block 240, it is determined that the results of the first stage of the process, detection based on differential decoding, is unsuccessful, in that the largest one of the first correlation results does not meet the predetermined reliability criterion. As a result, the coherent detection stage is triggered. Thus, as shown at block 250, the method continues, in response to determining that the correlation result is unreliable, with correlating the obtained sequence of samples with a second reference sequence, at each of a plurality of time offsets and at each of a plurality of frequency offsets, to generate a corresponding plurality of second correlation results, and identifying which combination of time offset and frequency offset results in a largest one of the second correlation results. Again, this step may be performed for each of several candidate reference sequences. Here, it is the obtained sequence of samples that is used for the correlation, not the differentially decoded sequence. Further, the reference sequence used here is different from, but related to the one used in the differential-decoding stage. More particularly, the first reference sequence, used in the differential-decoding stage (at block 230) comprises a differentially decoded version of the second reference sequence, which is used in the coherent detection stage at 250.

As discussed above, synchronization signals based on Zadoff-Chu sequences have good autocorrelation and cross-correlation properties. Thus, in some embodiments, the second reference sequence corresponds to a Zadoff-Chu sequence. These techniques may be applied in an LTE UE, for example, e.g., where the synchronization sequence in the received signal is a Primary Synchronization Signal in a Long-Term Evolution signal.

Figure 2:
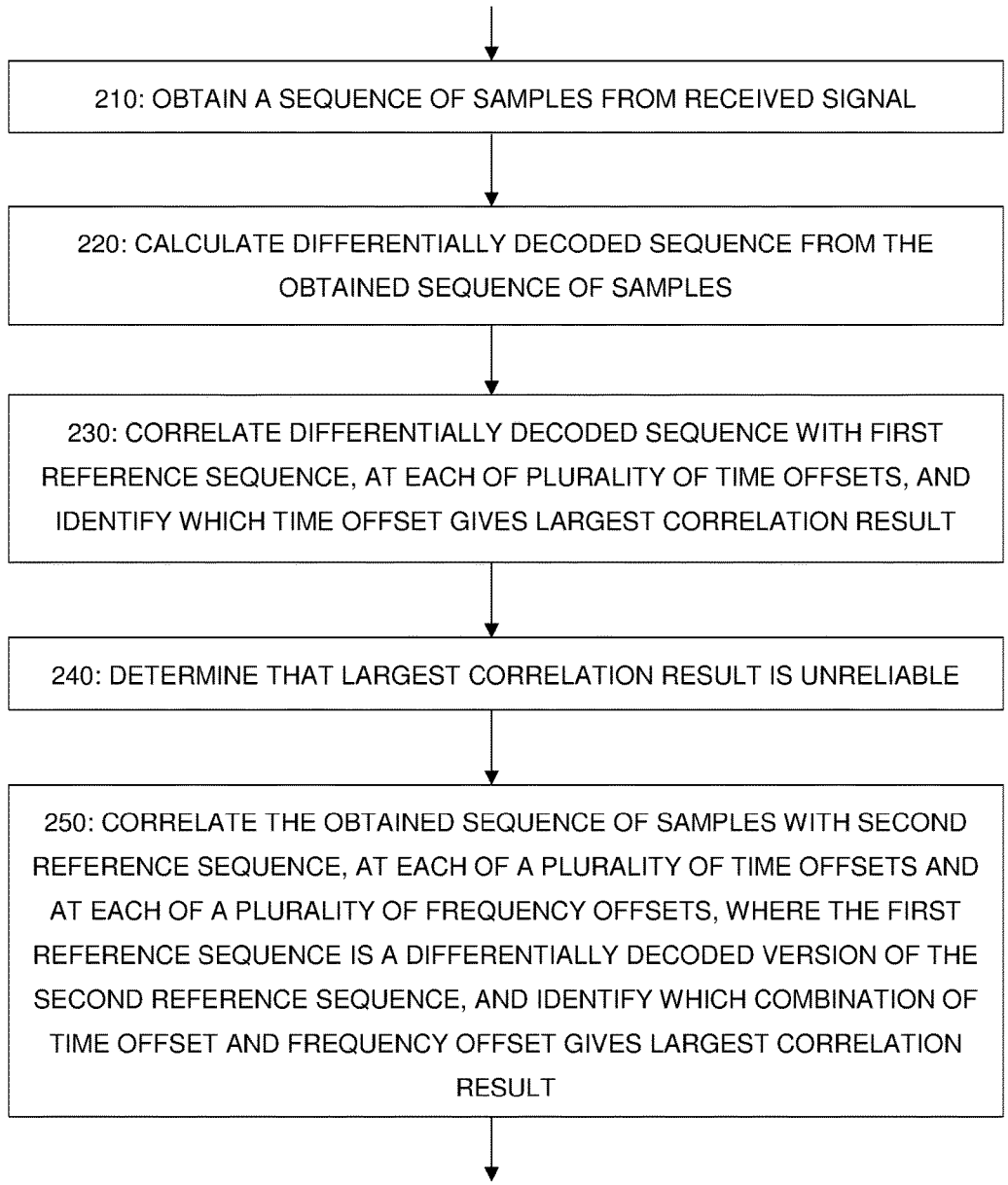
FIG. 2 is a process flow diagram illustrating another example method, according to some embodiments.

In some embodiments, the techniques described herein, including the process shown in FIG. 2, may be performed periodically, i.e., at each of a plurality of periodic intervals. In some embodiments, the method shown in FIG. 2 may further comprise, after determining that the largest one of the first correlation results does not meet the predetermined reliability criterion, performing only coherent detection of the synchronization signal during a first time period. In some embodiments, the length of the first time period may be predetermined, while in others the length of the first time period may be based upon a measure of how far the largest one of the first correlation results is from meeting the predetermined reliability criterion, in some embodiments. In still other embodiments, the first time period extends until an estimated signal quality for the received signal exceeds a predetermined signal quality threshold.

As noted above, the process flow shown in FIG. 2 is based on the outcome of the first stage, shown at blocks 210-230 and in which the correlations use differentially decoded sequences being an unreliable result. In this case a coherent detection mode, shown at block 250, is then triggered. The process flow of FIG. 2 thus corresponds to the process illustrated in FIG. 1, but in a scenario where the "N" branch is taken from block 125—the "N" branch corresponds to the outcome where the largest correlation result from the differential-decoding-based stage is determined to not meet the predetermined reliability criterion. Of course, in any practical implementation, the differentially-decoding-based detection stage will often be successful, such that the coherent detection stage is unnecessary. Thus, it should be understood that the process flows shown in FIGS. 1 and 2 may be repeated, with the outcomes of the reliability testing varying from time to time. In the context of FIG. 1, for instance, a first pass through the flow may result in the differential-decoding-based stage yielding an unreliable result, such that the resulting process corresponds to the process of FIG. 2. A subsequent pass through the flow of FIG. 1, where the sequence of samples from the received signal correspond to a different time interval, may result in the differential-decoding-based yielding a reliable result. In this case, a frequency offset may be estimated by comparing the differentially decoded sequence from the second pass to the differentially-decoded version of the reference signal.

Any of the techniques described herein may be implemented in a wireless device adapted to carry out one or more of the processes and methods described above, including those illustrated in FIGS. 1 and 2. Such a wireless device may be any of a wide variety of devices, including UEs or other mobile terminals, smartphones, wireless-enabled tablet computers or laptop computers, machine type communication devices, etc. A wireless device implementing any of these techniques may be an access node, such as a base station, in some embodiments.

Figure 3:
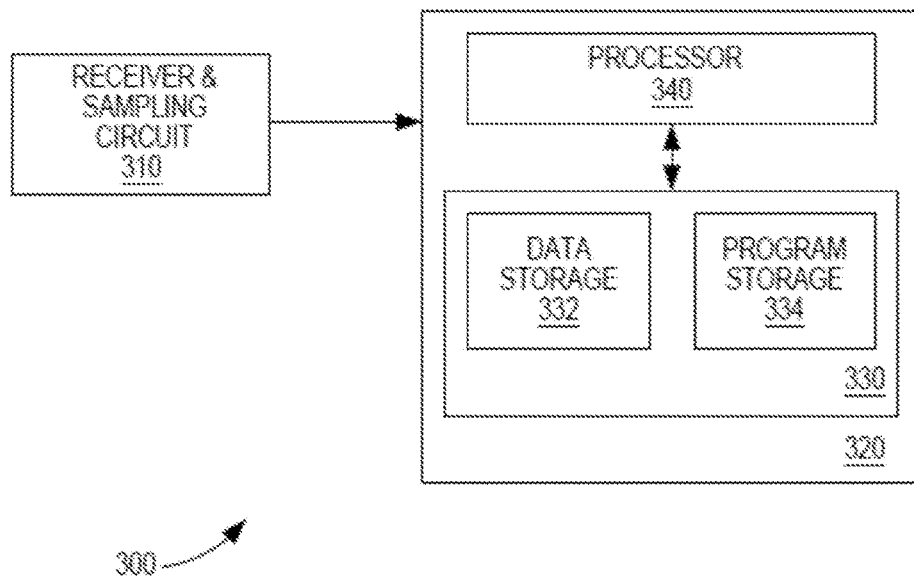
FIG. 3 is a block diagram illustrating some components of an example wireless device configured to carry out one or more of the techniques described herein.

FIG. 3 is a block diagram illustrating some of the relevant components of an example wireless device 300 configured to carry out one or more of the techniques described herein, including, for example, the techniques described in FIGS. 1 and 2, as well as any variants thereof. As seen in the figure, wireless device 300 includes a receiver and sampling circuit 310. Various designs of receiver and sampling circuits for wireless devices are well known. The design for any given implementation will vary based on the wireless standard (if any) for which the device is designed, performance and cost requirements, etc. Typically, these circuits will include a low-noise amplifier and a frequency-down-conversion circuit, with appropriate analog filtering, followed by a digital sampling circuit, i.e., an analog-to-digital converter.

Wireless device 300 further comprises a processing circuit 320, which in turn includes processor(s) 340, coupled to memory circuit 330. Processor 340, which may also be referred to in some embodiments as a central-processing unit (CPU), may comprise one or more microprocessors, microcontrollers, and/or the like. Memory circuit 330, which may comprise one or several types of memory such as RAM, ROM, Flash, optical storage devices, magnetic storage devices, and the like, includes program storage 334, storing computer program instructions for execution by processor 340, and data storage 332, for storing input parameters, outputs from processing operations, etc. The program instructions stored in program storage 334 include instructions for carrying out one or more of the techniques described above.

In devices configured to carry out one or more of the techniques described herein, receiver and sampling circuit 310 is configured to obtain, from a received signal, a sequence of samples for a given time interval. This sequence of samples is supplied to the processing circuit 320.

Processing circuit 320, in some embodiments, is configured to calculate a differentially decoded sequence from the obtained sequence of samples, each element of the differentially decoded sequence representing a phase shift between a pair of samples from the obtained sequence of samples. Processing circuit 320 may be further configured to correlate the calculated differentially decoded sequence with a first reference sequence corresponding to the synchronization signal, at each of a plurality of time offsets, to generate a corresponding plurality of first correlation results, and to identify which of the plurality of time offsets results in a largest one of the first correlation results. In response to determining that the largest one of the first correlation results does not meet a predetermined reliability criterion, the processing circuit 320 is further configured to correlate the obtained sequence of samples with a second reference sequence, at each of a plurality of time offsets and at each of a plurality of frequency offsets, to generate a corresponding plurality of second correlation results, and to identify which combination of time offset and frequency offset results in a largest one of the second correlation results. Again, the first reference sequence comprises a differentially decoded version of the second reference sequence.

Figure 4:
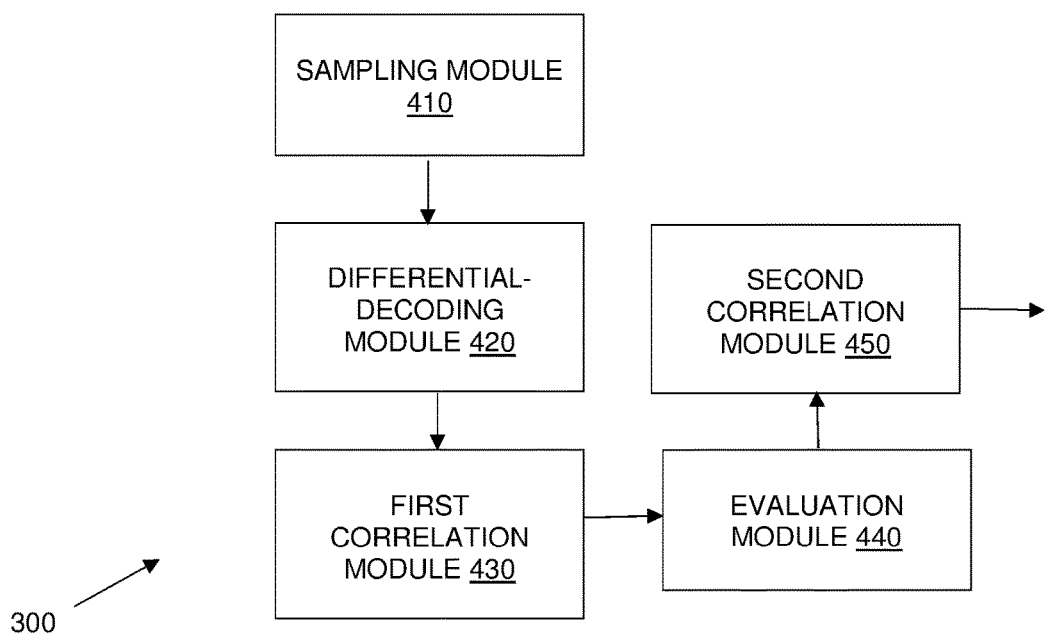
FIG. 4 is a block diagram illustrating a functional representation of a wireless device configured to carry out one or more of the techniques described herein.

FIG. 4 is a block diagram illustrating a functional representation of wireless devices, including several functional "modules." It will be appreciated that each of these modules may correspond to a module/segment of program code, executing on a suitable processing circuit, or to analog and/or digital processing circuitry, or to some combination thereof. As seen in the figure, wireless device 300 includes a sampling module 410 for obtaining, from a received signal, a sequence of samples for a given time interval, and further includes a differential-decoding module 420 for calculating a differentially decoded sequence from the obtained sequence of samples, each element of the differentially decoded sequence representing a phase shift between a pair of samples from the obtained sequence of samples. Wireless device 300 in this representation further comprises a first correlation module 430, for correlating the calculated differentially decoded sequence with a first reference sequence corresponding to the synchronization signal, at each of a plurality of time offsets, to generate a corresponding plurality of first correlation results, and identifying which of the plurality of time offsets results in a largest one of the first correlation results. An evaluation module 440 is for determining that the largest one of the first correlation results does not meet a predetermined reliability criterion, and a second correlation module 450 is for, in response to said determining, correlating the obtained sequence of samples with a second reference sequence, at each of a plurality of time offsets and at each of a plurality of frequency offsets, to generate a corresponding plurality of second correlation results, and identifying which combination of time offset and frequency offset results in a largest one of the second correlation results. As in the other embodiments described above, the first reference sequence comprises a differentially decoded version of the second reference sequence.

All of the variations described above in connection with the processes illustrated in FIGS. 1 and 2 are equally applicable to example wireless device 300. It will be appreciated that wireless device 300 may be configured to carry out multiple ones of the processes discussed above, e.g., at different times and/or under different circumstances.

As discussed above, the two-stage procedures described combine the strengths of coherent and differentially decoding reception modes, to reduce wireless device complexity and improve performance in most scenarios. This is done without sacrificing detection performance in coverage-limited situations. In non-coverage-limited cases, the synchronization search complexity is significantly reduced, because the frequency dimension is omitted. In coverage-limited cases, the receiver reverts to the classical coherent structure, with maximal detection performance at low SNRs. While the two-stage process adds overhead to the conventional process in low-SNR scenarios, where both stages are used, the additional overhead from the differential-decoding stage is small.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device, for detecting time and frequency offsets for a synchronization signal in a received signal, the method comprising:
   obtaining, from the received signal, a sequence of samples for a first time interval;
   calculating a differentially decoded sequence from the obtained sequence of samples, each element of the differentially decoded sequence representing a phase shift between a pair of samples from the obtained sequence of samples;
   correlating the calculated differentially decoded sequence with a first reference sequence corresponding to the synchronization signal, at each of a plurality of time offsets, to generate a corresponding plurality of first correlation results, and identifying which of the plurality of time offsets results in a largest one of the first correlation results;
   determining that the largest one of the first correlation results does not meet a predetermined reliability criterion; and
   in response to said determining, coherently detecting the synchronization signal by correlating the obtained sequence of samples with a second reference sequence, at each of a plurality of time offsets and at each of a plurality of frequency offsets, to generate a corresponding plurality of second correlation results, and identifying which combination of time offset and frequency offset results in a largest one of the second correlation results;
   wherein the first reference sequence comprises a differentially decoded version of the second reference sequence.

2. The method of claim 1, wherein determining that the largest one of the first correlation results does not meet a predetermined reliability criterion comprises comparing a magnitude of the largest one of the first correlation results or a scaled magnitude of the largest one of the first correlation results to a threshold value.

3. The method of claim 2, wherein the predetermined reliability criterion comprises one of the following:
   the magnitude or scaled magnitude of the largest one of the first correlation results exceeding the threshold value;
   the magnitude or scaled magnitude of the largest one of the first correlation results equaling or exceeding the threshold value;
   the scaled magnitude of the largest one of the first correlation results being less than the threshold value; and
   the scaled magnitude of the largest one of the first correlation results being less than or equal to the threshold value.

4. The method of claim 1, wherein the second reference sequence corresponds to a Zadoff-Chu sequence.

5. The method of claim 4, wherein the synchronization signal in the received signal is a Primary Synchronization Signal in a Long-Term Evolution signal.

6. The method of claim 1, wherein determining that the largest one of the first correlation results does not meet a predetermined reliability criterion comprises:
   calculating a ratio of the magnitude of the largest one of the first correlation results to a comparison value; and
   determining that the ratio is less than the threshold value, where a ratio greater than the threshold value meets the predetermined reliability criterion.

7. The method of claim 6, wherein the comparison value is one of:
   the magnitude of the second-largest one of the first correlation results;
   the average magnitude of all of the first correlation results;
   the average magnitude of all of the first correlation results other than the largest one of the first correlation results; and
   an estimate of noise and interference variance.

8. The method of claim 1, wherein the method further comprises repeating the operations of claim 1 at each of a plurality of periodic intervals.

9. The method of claim 1, wherein the method further comprises, after determining that the largest one of the first correlation results does not meet a predetermined reliability criterion, performing only coherent detection of the synchronization signal during a first time period.

10. The method of claim 9, wherein a length of the first time period is based upon a measure of how far the largest one of the first correlation results is from meeting the predetermined reliability criterion.

11. The method of claim 9, wherein the first time period extends until an estimated signal quality for the received signal exceeds a predetermined signal quality threshold.

12. The method of claim 1, further comprising:
   obtaining, from the received signal, a second sequence of samples for a second time interval, the second time interval differing from the first time interval;
   calculating a second differentially decoded sequence from the second sequence of samples, each element of the second differentially decoded sequence representing a phase shift between a pair of samples from the second sequence of samples;
   correlating the second differentially decoded sequence with the first reference sequence, at each of a plurality of time offsets, to generate a corresponding plurality of third correlation results, and identifying which of the plurality of time offsets results in a largest one of the third correlation results;
   determining that the largest one of the third correlation results meets a predetermined reliability criterion; and
   estimating a frequency offset by comparing the second differentially decoded sequence to the first reference sequence.

13. A wireless device arranged to detect time and frequency offsets for a synchronization signal in a received signal, the wireless device comprising:
   a receiver and sampling circuit configured to obtain, from the received signal, a sequence of samples for a first time interval; and
   a processing circuit configured to
   calculate a differentially decoded sequence from the obtained sequence of samples, each element of the differentially decoded sequence representing a phase shift between a pair of samples from the obtained sequence of samples,
   correlate the calculated differentially decoded sequence with a first reference sequence corresponding to the synchronization signal, at each of a plurality of time offsets, to generate a corresponding plurality of first correlation results, and identify which of the plurality of time offsets results in a largest one of the first correlation results, determine, that the largest one of the first correlation results does not meet a predetermined reliability criterion, and in response to said determining, coherently detect the synchronization signal by correlating the obtained sequence of samples with a second reference sequence, at each of a plurality of time offsets and at each of a plurality of frequency offsets, to generate a corresponding plurality of second correlation results, and identify which combination of time offset and frequency offset results in a largest one of the second correlation results;

wherein the first reference sequence comprises a differentially decoded version of the second reference sequence.

14. The wireless device of claim 13, wherein the processing circuit is configured to determine that the largest one of the first correlation results does not meet a predetermined reliability criterion by comparing a magnitude of the largest one of the first correlation results or a scaled magnitude of the largest one of the first correlation results to a threshold value.

15. The wireless device of claim 14, wherein the predetermined reliability criterion comprises one of the following:
the magnitude or scaled magnitude of the largest one of the first correlation results exceeding the threshold value;
the magnitude or scaled magnitude of the largest one of the first correlation results equaling or exceeding the threshold value;
the scaled magnitude of the largest one of the first correlation results being less than the threshold value; and
the scaled magnitude of the largest one of the first correlation results being less than or equal to the threshold value.

16. The wireless device of claim 13, wherein the second reference sequence corresponds to a Zadoff-Chu sequence.

17. The wireless device of claim 16, wherein the synchronization signal in the received signal is a Primary Synchronization Signal in a Long-Term Evolution signal.

18. The wireless device of claim 13, wherein the processing circuit is configured to determine that the largest one of the first correlation results does not meet a predetermined reliability criterion by:
calculating a ratio of the magnitude of the largest one of the first correlation results to a comparison value; and
determining that the ratio is less than the threshold value, where a ratio greater than the threshold value meets the predetermined reliability criterion.

19. The wireless device of claim 18, wherein the comparison value is one of:
the magnitude of the second-largest one of the first correlation results;
the average magnitude of all of the first correlation results;
the average magnitude of all of the first correlation results other than the largest one of the first correlation results; and
an estimate of noise and interference variance.

20. The wireless device of claim 13, wherein the processing circuit is configured to repeat the operations of claim 13 at each of a plurality of periodic intervals.

21. The wireless device of claim 13, wherein the processing circuit is configured to, after determining meets the predetermined reliability criterion, perform only coherent detection of the synchronization signal during a first time period.

22. The wireless device of claim 21, wherein a length of the first time period is based upon a measure of how far the largest one of the first correlation results is from meeting the predetermined reliability criterion.

23. The wireless device of claim 21, wherein the first time period extends until an estimated signal quality for the received signal exceeds a predetermined signal quality threshold.

24. The wireless device of claim 13, wherein the processing circuit is configured to:
obtain, from the received signal, a second sequence of samples for a second time interval;
calculate a second differentially decoded sequence from the second sequence of samples, each element of the second differentially decoded sequence representing a phase shift between a pair of samples from the second sequence of samples;
correlate the second differentially decoded sequence with the first reference sequence, at each of a plurality of time offsets, to generate a corresponding plurality of third correlation results, and identifying which of the plurality of time offsets results in a largest one of the third correlation results;
determine that the largest one of the third correlation results meets a predetermined reliability criterion; and
estimate a frequency offset by comparing the second differentially decoded sequence to the first reference sequence.

25. A non-transitory computer-readable medium comprising, stored thereupon, a computer program product comprising computer program instructions for execution by a wireless device, wherein the computer program instructions are arranged such that, when executed by a processing circuit in the wireless device, the computer program instructions cause the wireless device to detect time and frequency offsets for a synchronization signal in a received signal by:
obtaining, from the received signal, a sequence of samples for a first time interval;
calculating a differentially decoded sequence from the obtained sequence of samples, each element of the differentially decoded sequence representing a phase shift between a pair of samples from the obtained sequence of samples;
correlating the calculated differentially decoded sequence with a first reference sequence corresponding to the synchronization signal, at each of a plurality of time offsets, to generate a corresponding plurality of first correlation results, and identify which of the plurality of time offsets results in a largest one of the first correlation results;
determining that the largest one of the first correlation results does not meet a predetermined reliability criterion; and
in response to said determining, coherently detecting the synchronization signal by correlating the obtained sequence of samples with a second reference sequence, at each of a plurality of time offsets and at each of a plurality of frequency offsets, to generate a corresponding plurality of second correlation results, and identify which combination of time offset and frequency offset results in a largest one of the second correlation results;

wherein the first reference sequence comprises a differentially decoded version of the second reference sequence.

\* \* \* \* \*